March 6, 1956 T. A. ST. CLAIR ET AL 2,737,201
APPLIANCE REGULATOR
Filed Oct. 29, 1952
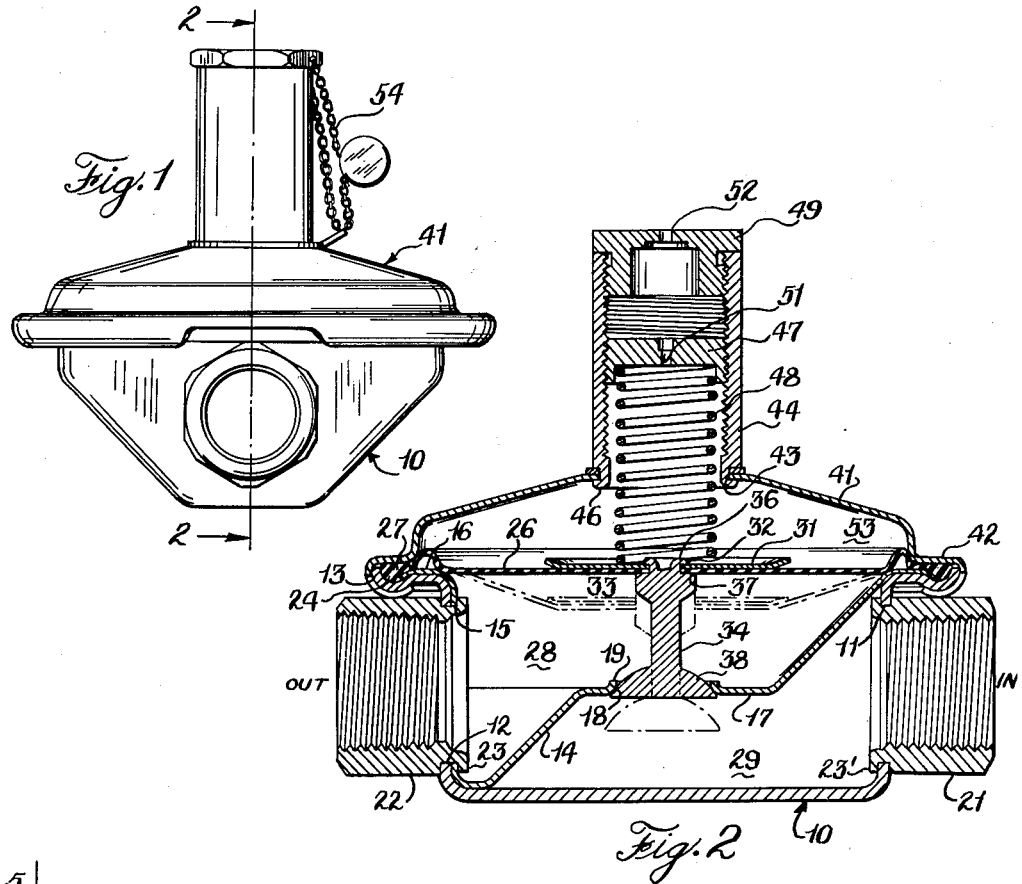
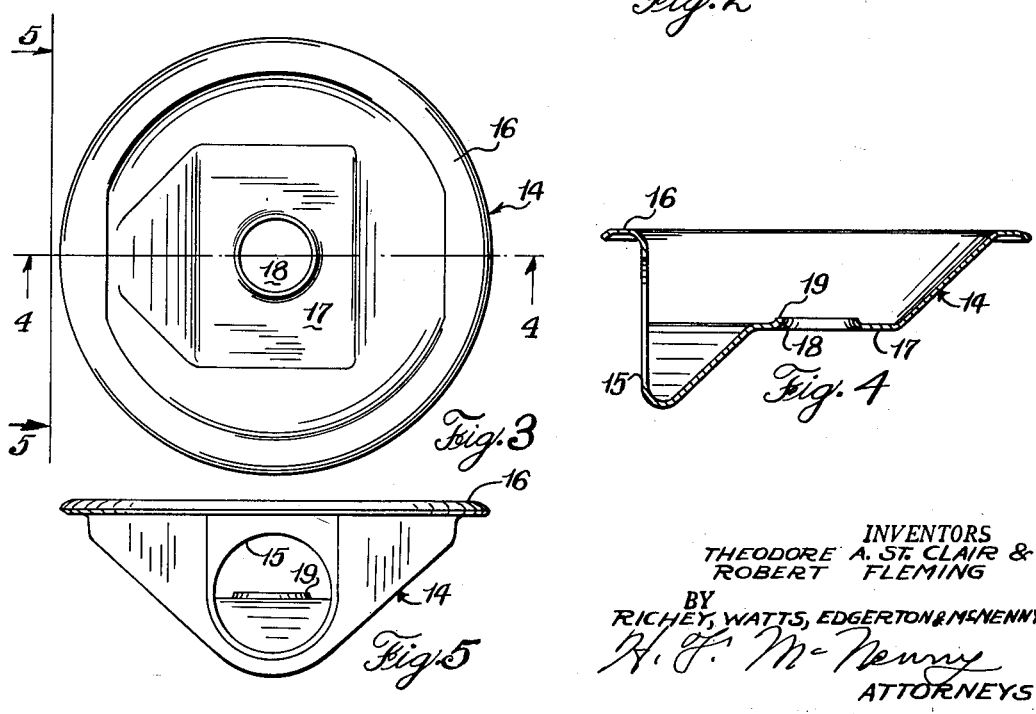
INVENTORS
THEODORE A. ST. CLAIR &
ROBERT FLEMING
BY
RICHEY, WATTS, EDGERTON & McNENNY
ATTORNEYS United States Patent Office 2,737,201
Patented Mar. 6, 1956

2,737,201

APPLIANCE REGULATOR

Theodore A. St. Clair, South Euclid, and Robert Fleming, Euclid, Ohio, assignors to The Weatherhead Company, Cleveland, Ohio, a corporation of Ohio Application October 29, 1952, Serial No. 317,532

5 Claims. (Cl. 137—505.41)

This invention relates to pressure regulators of the type employed for supplying fluid at a reduced pressure from a relatively high pressure source. One of the applications of this invention is for use in liquified petroleum gas installations and general systems in which the pressure of gas flowing from a container is substantially reduced and maintained at a substantially constant value through a considerable range of flow when the inlet pressure varies over a considerable range.

With the increased use of liquified petroleum gas installations in the home, a large market has developed for pressure regulators which may be manufactured at low cost while performing efficiently and effectively for extended periods of time with little or no maintenance. In order to provide a commercially successful regulator valve it is necessary that the valve be adaptable to high production and low cost manufacturing processes which permit the reduction of the unit cost to a very minimum without sacrificing efficiency of operation. In order to provide a regulator valve having a long trouble-free service life it is also desirable to reduce the number of moving parts to a minimum thus eliminating as much as possible the possibility of failure due to wear.

An object of this invention is to simplify, lighten, and make more economical the assembly of the pressure regulator as well as improve the flow pattern of the regulator and increase the maximum flow which the regulator is capable of regulating without increasing the size of the regulator itself. In addition, it is an object of this invention to provide a regulator wherein the regulating means are simple and economical in their construction and durable in operation.

The foregoing and other objects and advantages will become apparent in view of the following description taken in conjunction with the drawings, wherein:

Referring to the drawings:

Fig. 1 is an end view showing the exterior shape;

Fig. 2 is a side elevation in section showing the assembled pressure regulator;

Fig. 3 is a plan view of the partition;

Fig. 4 is a side view in section of the partition; and

Fig. 5 is an end view of the partition plate.

The regulator comprises a casing consisting principally of a body stamping 10 including an inlet aperture 11 and an outlet aperture 12 and formed with a peripheral flange 13. A partition stamping 14 is formed with an outlet aperture 15 adjacent to the outlet aperture 12 of the body 10 and a peripheral flange 16. The partition 14 is formed to fit within the cavity of the body 10 with the peripheral flange 13 of the body 10 extending beyond the flange 16 of the partition 14. The lower wall of the partition 14 is formed with an intermediate centrally located horizontal portion 17. An aperture 18 is formed in the horizontal portion 17 with its edge 19 flaring upwardly and inwardly providing a valve seat. An inlet fitting 21 and an outlet fitting 22 are fixed in the inlet aperture 11 and the outlet apertures 12 and 15, these fittings being threaded in any standard manner or otherwise adapted for connection to a high pressure inlet and low pressure outlet pipe or other fittings (not shown). The fittings 21 and 22 are preferably secured temporarily in their respective apertures by rolling over the flange or bead as indicated at 23 and 23' and are then hydrogen brazed to the casings to provide a fluid-tight seal and a high degree of mechanical strength. Around the periphery of the flange 13 beyond the flange 16 an annular groove 24 is formed.

A thin flexible diaphragm 26 is located above the lower body assembly and is formed with a peripheral bead 27 which fits into the groove 24 and engages both the flanges 13 and 16. Since the bead 27 engages the flange 13 as well as the flange 16 a fluid seal between the partition 14 and the body 10 is assured even if the brazing between the two flanges has imperfections.

The diaphragm 26, in conjunction with the partition 14, defines a diaphragm regulating chamber 28 in fluid communication with the outlet fitting 22. The body 10, in cooperation with the partition 14, defines a high pressure chamber 29 in fluid communication with the inlet fitting 21.

A backing plate 31 is positioned adjacent to the upper surface of the diaphragm 26 and is formed with a centrally located aperture 32 adjacent to a similar centrally located aperture 33 in the diaphragm 26. A valve closure member 34 is mounted on the lower surface of the diaphragm 26 by means of a flange portion 36 which extends through the apertures 32 and 33 and is flared out into engagement with the upper surface backing plate 31. The shoulder 37 engages the lower surface of the diaphragm 26 adjacent to the aperture 33 and provides a fluid seal between the closure member 34 and the diaphragm 26. At the lower end of the closure member 34 an enlarged sealing section 38 is formed which is positioned below the horizontal portion 17 of the partition part 14. The sealing section 38 is proportioned to engage the edge 19 of the aperture 18 thereby closing the aperture and preventing any flow between the chambers 28 and 29 when the closure member 34 is moved upwardly by the diaphragm 26.

The upper body assembly is comprised of an upper cap 41 which is formed of a thin metal stamping having a peripheral flange 42 adapted to engage the upper side of the bead 27. A centrally located aperture 43 is formed in the upper wall of the upper cap 41. An internally threaded spring tube 44 is mounted in the aperture 43 in the same manner as the inlet and outlet fittings 21 and 22 by a flange or bead 46. Hydrogen brazing is utilized at the joint between the upper cap 41 and the spring tube 44 to provide increased strength and a fluid seal.

The flange 42 of the upper cap 41 is deformed around the side and under the flange 13 of the body 10 thereby compressing the bead 27 of the diaphragm 26 into sealing engagement with the flanges 13, 16 and 42 and thereby securely mounting the upper body assembly on the lower body assembly. A circumferentially threaded spring retainer 47 is threaded into the spring tube 44. The spring 48 is positioned between the backing plate 31 and the spring retainer 47 and urges the backing plate and the diaphragm downwardly tending to open the regulator valve. A spring tube cap 49 is threaded into the end of the spring thereby closing the end of the spring tube and prevent accidental tampering with the spring retainer 47. Axial passages 51 and 52 are formed in the spring retainer 47 and the spring tube cap 49 respectively to provide a vent for the reference chamber 53 defined by the upper body assembly and the diaphragm 26.

It is apparent that all of the elements of the above described pressure regulator may be formed by simple stamping or automatic screw machine operations thereby reducing the unit cost to a very minimum. Again, the number of moving parts within the regulator have been reduced to a very minimum since all of the links and levers normally found in pressure regulators have been eliminated providing a pressure regulator capable of an extended service life with little or no maintenance.

Since the spring retainer 47 is threaded into the spring tube 44 axial adjustment is provided to vary the spring force deflecting the diaphragm so that the regulator may be adjusted through a relatively large range of regulated pressures. A lock wire 54 may be provided to prevent the removal of the cap 49 thereby preventing tampering with the regulator once the desired pressure is set.

In operation, fluid under pressure enters the lower regulator body through the inlet fitting 21 and passes into the high pressure chamber 29. When the regulating valve is in the position shown in phantom in Fig. 1 the fluid is free to flow from the high pressure chamber 29 into the diaphragm regulating chamber 28. When the pressure within the diaphragm chamber 28 builds up to the predetermined value the force within this chamber exerts enough pressure on the diaphragm 26 to overcome the force of the spring 48 and move the diaphragm and valve to the position shown in solid in Fig. 1 thereby closing the regulating valve and preventing further fluid flow between the chambers 28 and 29.

It is apparent that since an almost unrestricted flow pattern is provided for the fluid that a regulator of a given size according to this invention is capable of handling a larger volume of fluid than prior regulators wherein projections and orifices are present to limit the flow of fluid.

Having completed a detailed description of a preferred embodiment of the present invention so that others skilled in the art may be able to understand and practice the same, we state that what we desire to secure by Letters Patent is not limited by said preferred embodiment but rather is defined in what is claimed.

What is claimed is:

1. A method of forming a fluid pressure regulator comprising the steps of drawing a sheet of metal into a cup-shaped body having inlet and outlet apertures and an outwardly extending continuous flange at its open end, deforming a second sheet of metal into a cup-shaped partition with an outlet aperture, an inlet aperture centrally located in the bottom thereof and an outwardly extending continuous flange, assembling said partition in the cavity of said body with said partition outlet aperture adjacent to said body outlet and said partition inlet spaced from the bottom of said body, said partition flange terminating inwardly said body flange, brazing said body and partition along the area of engagement therebetween, deforming a sheet of metal into an upper body cap having a centrally located aperture and an outwardly extending flange at the open end thereof, positioning a flexible diaphragm with a closure member attached thereto adapted to close said partition inlet against said body and partition flanges providing a fluid seal therewith, positioning said upper body cap against said diaphragm on the side opposite said body and partition flanges and deforming said upper body cap flange around the circumference and under the lower side of said body flange.

2. A method of forming a fluid pressure regulator comprising the steps of drawing a sheet of metal into a cup shaped body having inlet and outlet apertures and an outwardly extending flange at its open end, deforming a second sheet of metal into a cup shaped partition with an outlet aperture, an inlet aperture centrally located in the bottom thereof and an outwardly extending flange, assembling said partition in the cavity of said body with said partition outlet aperture adjacent to said body outlet and said partition inlet spaced from the bottom of said body, said partition flange engaging said body flange inwardly the edge thereof, positioning an inlet fitting adjacent to one side of said body inlet aperture with a bead extending through said body inlet aperture, positioning an outlet fitting adjacent to one side of said outlet apertures with a bead extending through said outlet apertures, deforming said beads into engagement with the other side of said apertures, brazing said body partition and fittings along the area of engagement therebetween, deforming a sheet of metal into an upper body cap having a centrally located aperture and an outwardly extending flange at the open end thereof, positioning a flexible diaphragm with a closure member attached thereto adapted to close said partition inlet against said body and partition flanges, positioning said upper body cap against said diaphragm on the side opposite said body and partition flanges and deforming said upper body cap flange around the circumference and under the lower side of said body flange.

3. A fluid pressure regulator comprising a body having a continuous peripheral flange, a diaphragm, means pressing said diaphragm into sealing engagement with the peripheral flange of said body, a partition having a continuous peripheral flange gripped between said diaphragm and the inner portion of the peripheral flange of said body, said partition dividing said body into two chambers sealed from each other around their peripheries by the engagement of said diaphragm with the peripheral flange of said partition, and sealed from the atmosphere by the engagement of said diaphragm with the peripheral flange of said body radially outside of said partition, said regulator being formed with an opening into each of said chambers, a valve opening in said partition and valve means operably connected to said diaphragm for controlling said valve opening.

4. In a fluid pressure regulator comprising a body having a peripheral flange, a diaphragm, means pressing the diaphragm into sealing engagement with the peripheral flange of the body, a partition dividing the body into inlet and outlet chambers and having a valve opening therethrough, valve means operably connected to the diaphragm and controlling the valve opening, and inlet and outlet openings communicating respectively with the inlet and outlet chambers; the improvement consisting of the fact that the partition is a separate member having a continuous peripheral flange gripped between the diaphragm and the inner portion only of the peripheral flange of the body, leaving the outer portion of the peripheral flange of the body in direct sealing engagement with the diaphragm.

5. A fluid pressure regulator comprising a body having a continuous peripheral flange, a partition dividing said body into two chambers, said partition having a continuous peripheral flange fitting over and brazed to the flange of said body, a diaphragm, means pressing said diaphragm into sealing engagement with the flange of said partition and sealing said two chambers from each other around their peripheries, inlet and outlet connectors, one of said connectors extending through said body and said partition into one of said chambers, the other of said connectors extending through said body into the other of said chambers, a valve opening in said partition, and valve means operably connected to said diaphragm for controlling said valve opening.

References Cited in the file of this patent

UNITED STATES PATENTS

| | | |
|---|---|---|
| 1,399,013 | Fleener | Dec. 6, 1921 |
| 2,122,957 | Santamaria | July 5, 1938 |
| 2,239,116 | Ray | Apr. 22, 1941 |
| 2,418,448 | Arbogast | Apr. 8, 1947 |
| 2,669,071 | St. Clair | Feb. 16, 1954 |

FOREIGN PATENTS

| | | |
|---|---|---|
| 517,132 | Great Britain | 1940 |